United States Patent Office 2,760,946
Patented Aug. 28, 1956

2,760,946

RUBBER COMPOSITIONS

John C. Hillyer, Bartlesville, Okla., assignor to Phillips Petroleum Company, a corporation of Delaware No Drawing. Application May 20, 1954,
Serial No. 431,293

15 Claims. (Cl. 260—30.4)

This invention relates to novel compositions of matter. In one of its more specific aspects, it relates to rubber-like, vulcanizable compositions comprising a rubber and a polycyclic alcohol. In another of its more specific aspects, it relates to polycyclic alcohols as softeners, and/or tackifiers for synthetic and/or natural rubber. In still another of its more specific aspects, it relates to elastomer compounding.

This application is a continuation-in-part of my copending U. S. application Serial No. 255,520, filed November 8, 1951.

I have now discovered that polycyclic alcohols are good softeners and/or tackifiers for synthetic and/or natural rubber. The polycyclic alcohols used in this invention can be represented by the general formula

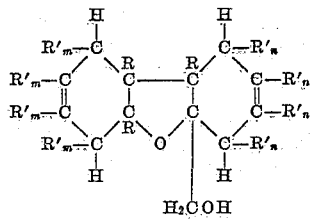

Wherein each R is of the group consisting of hydrogen and methyl and at least one R is hydrogen, and each R' is of the group consisting of hydrogen and an alkyl group having not more than 3 carbon atoms with the sum of the carbon atoms in the R'$_m$ and in the R'$_n$ in each case, not greater than three and at least two of the R'$_m$ and of the R'$_n$ are hydrogen. These novel alcohols are soluble in most of the common solvents such as benzene, isopentane, n-pentane, n-heptane, methanol, ethanol and others.

The following are objects of the invention.

It is an object of this invention to provide softeners and/or tackifiers for natural and/or synthetic rubbers.

Another object of this invention is to provide a process for compounding rubber-like vulcanizable organic elastomers.

A further object of this invention is to provide a rubber-like, vulcanizable composition of matter.

Further objects and advantages of this invention will become apparent to one skilled in the art from the accompanying disclosure and discussion.

The polycyclic alcohols can be prepared by the reduction of the corresponding aldehydes by suitable means, such as by a crossed Cannizzaro reaction. Polycyclic aldehydes from which the materials can be prepared are fully described in the patent application of J. C. Hillyer et al., Serial No. 81,413, filed March 14, 1949 and now Patent No. 2,683,151, the disclosure of which is incorporated into and made a part of this disclosure. This patent application also describes a method for the production of said aldehydes.

The polycyclic aldehydes from which the polycyclic alcohols are prepared are obtained by reacting a suitable diolefin with a suitable furfural. As the diolefin reactant it is preferred to use a conjugated diolefin, preferably a conjugated diolefin having not more than about 7 carbon atoms per molecule. Such a diolefin can be referred to as a member of the group consisting of 1,3-butadiene and its immediate homologues and may be reported as having the formula

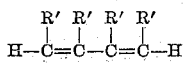

wherein each R' is of the group consisting of hydrogen and an alkyl group having not more than three carbon atoms and wherein at least two R' are hydrogen atoms. The furfural reactant employed in the practice of this invention can be referred to as one of the group consisting of furfural and its immediate homologues having not more than six carbon atoms per molecule, such as an alkyl substituted furfural having not more than six carbon atoms per molecule. Such material may be represented by the general formula

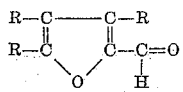

wherein each R is of the group consisting of hydrogen and a methyl group and wherein at least one R is a hydrogen atom. The more commonly used reactants employed as starting materials in the production of the polycyclic aldehydes prior to the preparation of the polycyclic alcohols therefrom include 1,3-butadiene and furfural, isoprene and furfural, piperylene and furfural and the corresponding diolefins with a methyl furfural. It appears that in producing the raw material polycyclic aldehyde, two molecules of the diolefin react with one molecule of the furfural reactant by a modification of the Diels-Alder reaction.

Typical polycyclic alcohols which can be used in the practice of this invention are 2,3,4,5-bis-($\Delta^2$-butenylene)-tetrahydrofurfuryl alcohol, 3-methyl-2,3,4,5-bis($\Delta^2$-butenylene)-tetrahydrofurfuryl alcohol, 4-methyl-2,3,4,5-bis-(3-methyl-$\Delta^2$-butenylene)-tetrahydrofurfuryl alcohol, 3,5-dimethyl-2,3,4,5-bis(2,3,dimethyl - $\Delta^2$ - butenylene)-tetrahydrofurfuryl alcohol, 2,3(2-isopropyl - $\Delta^2$ - butenylene)-4,5(4-methyl-$\Delta^2$-butenylene) - tetrahydrofurfuryl alcohol, and 5-methyl-2,3(2-methyl - $\Delta^2$ - butenylene)-4,5-(2-ethyl-$\Delta^2$-butenylene)-tetrahydrofurfuryl alcohol as well as their higher and lower molecular weight homologues. A particularly preferred polycyclic alcohol is 2,3,4,5-bis($\Delta^2$-butenylene)-tetrahydrofurfuryl alcohol.

In its broadest aspect, my invention applies to providing polycyclic alcohols as softeners or tackifiers for vulcanizable organic elastomers containing unsaturated carbon to carbon bonds. My invention applies to softening or tackifying natural rubber or rubber-like polymers produced by the polymerization of aliphatic conjugated dienes, particularly those having from 4 to 6 carbon atoms per molecule, such as butadiene, isoprene, pentadienes, etc., or the copolymerization of such dienes with a compound containing a $CH_2=C<$ group copolymerizable therewith, such as styrene, acrylonitrile, etc. The polycyclic alcohols can be used in the processing of sulfur vulcanizable organic elastomers. The polycyclic alcohols used in the practice of my invention are very advantageously applied to the compounding of the relatively new low-temperature synthetic rubbers which are prepared by copolymerizing butadiene with styrene, with methylvinylpyridine, with acrylonitrile, and with other monomers in an emulsion system at a temperature of from $-20$ to $15°$ C. The softeners and/or tackifiers of my invention can be used with butyl rubber stocks which are produced by copolymerizing a major quantity of isobutylene. with a minor quantity of a conjugated diene, such as those mentioned hereinbefore. The softeners and/or tackifiers of my invention can be used with reclaimed natural or synthetic rubbers and with various mixtures of natural, synthetic, reclaimed natural and reclaimed synthetic rubber.

The amount of polycyclic alcohols employed as softeners or tackifiers will vary depending upon the type of polymer being processed and the properties desired in the finished product. It will usually be in the range of 1 to 75, preferably in the range of 1 to 50, parts by weight per 100 parts by weight of rubber and more desirably in the range of 3 to 25 parts by weight per 100 parts by weight of rubber, the larger amounts being used for high Mooney viscosity materials.

Vulcanizable organic elastomer compositions usually contain other ingredients including fillers; modifiers; softeners, tackifiers, and plasticizing substances; vulcanizing agents; age resistors or antioxidants; and accelerators of vulcanization; accelerator activators; etc. The exact composition of the vulcanizable organic elastomer composition depends upon the use to which the vulcanizable composition is to be put. The new softeners and tackifiers of my invention can be used in any of the various compounding recipes.

Carbon black is added to many vulcanizable organic elastomer mixes during compounding as a filler. In some instances the carbon black or other filler is added to the latex of the polymer prior to coagulation. Other ingredients such as the softener may also be added in this manner. This technique is usually termed masterbatching. There are many types of carbon blacks used today in compounding, among which are: recently developed high pH furnace carbon blacks having a pH of from 8.0 to 10.5, usually 8.6 to 10.1, such as high abrasion furnace carbon blacks (HAF blacks), superabrasion furnace blacks (SAF blacks) and high modulus furnace carbon blacks (HMF blacks); reinforcing furnace blacks (RF blacks) and very fine furnace blacks (VFF blacks); easy, medium, or hard processing channel blacks; lamp blacks; fine and medium thermal carbon blacks; acetylene carbon blacks; semireinforcing furnace carbon blacks; conductive furnace and conductive channel carbon blacks; and high elongation furnace carbon blacks. Other pigments or additives, such as ferric oxide, magnesium carbonate, titanium dioxide, zinc oxide, hydrated alumina, kieselguhr, slate dust, zinc peroxide, zinc chloride, lead peroxide, lead oxide, chlorinated paraffins, glue, barytes, fossil flour, lithopone, various clays, finely divided silica, whiting, etc., can be added as fillers or to modify the properties of the vulcanizable composition or vulcanized composition, such properties as the rate of cure, resistance to scorching during processing, activation of acceleration, etc.

The polycyclic alcohols employed as softeners and tackifiers can be used alone or as mixtures with each other or in conjunction with other softeners and tackifiers. There are many such latter substances, among which are vegetable oils, such as palm oil, rape oil, olive oil, linseed oil, castor bean oil, soya bean oil, tung oil; bitumens including so-called mineral rubbers, which comprise natural products, such as gilsonite, raphaelite, and also high-boiling petroleum residues, asphalts, etc.; pine tar; paraffin wax; mineral oils; fatty acids, such as oleic acid, stearic acid, palmitic acid, lauric acid, etc.; ceresin; naphthalenes; rosin; wool grease; carnauba wax; the many organic chemical compounds, such as glycerol, glyceryl monostearate, glyceryl monooleate, glyceryl monoricinoleate, trioctyl phosphate, triglycol dioctoate, ethylene glycol monostearate and the monooleate, phenol-formaldehyde thermosetting resins, poly-alpha-methyl styrene, and other polymers of styrene and substituted styrene, dioctyl phthalate, dioctyl sebacate, polybutenes, zinc resinate, coumarone resins, dihydroabietic acid, etc. Most of these compounds aid tackiness as well as soften the vulcanizable organic elastomers. Also, some of them exhibit modifying characteristics.

Vulcanizing agents are added to vulcanize the organic elastomers during the vulcanization step of processing. There are a wide variety of vulcanizing agents, such as: sulfur, including powdered sulfur, or in one or more other forms, and mixtures thereof; so-called plastic sulfurs; sulfur-containing compounds, such as sulfur chloride, hydrogen sulfide, sulfur thiocyanate, tetraalkylthiuram disulfides, etc.; selenium; tellurium; benzoyl peroxide; trinitrobenzene; dinitrobenzene; nitrobenzene; quinones; certain inorganic oxidizing agents; diazoaminobenzene and its derivatives; other nitrogen-containing compounds, etc.

Accelerators of vulcanization are added to accelerate vulcanization during the vulcanization step of processing. There are many well known accelerators of vulcanization, such as: thioureas; thiophenols; mercaptans; dithiocarbamates; xanthates; trithiocarbonates; dithio acids, mercaptothiazoles; mercaptobenzothiazoles; thiuram sulfides; organic-cobalt chelates; etc., and various mixtures thereof. Some widely used and particularly good accelerators are, for instance, mercaptobenzothiazole, benzothiazyl disulfide, diphenylguanidine, zinc salt of mercaptobenzothiazole, zinc benzothiazyl sulfide, tetramethylthiuram disulfide, N-cyclohexyl-2-benzothiazole sulfenamide, aldehyde-ammonias, triphenylguanidine, zinc dibutyl and zinc dimethyl dithiocarbamate, many others, and mixtures thereof. Accelerator activators are also employed to advantage in some instances.

In most cases it is the usual practice to add age resistors or antioxidants to vulcanizable organic elastomer mixes during the mixing step of processing in order to slow down or prevent the deterioration of the vulcanized product. Antioxidants or age resistors have the property of maintaining tensile strength, resistance to abrasion, elasticity, preventing flex cracking, etc. One or more antioxidants are usually employed, such as phenyl-beta-naphthylamine, p-aminophenol, hydroquinone, p-hydroxydiphenyl, diphenylamine, 2,4-toluenediamine, p-ditolylamine, o-ditolyamine, beta-naphthyl-nitrosoamine, N,N'-diphenyl diaminoethane, phenyl-alpha-naphthylamine, p,p'-diaminodiphenylmethane, etc.

The vulcanizable organic elastomer compositions resulting from admixing the various ingredients with the new softeners and tackifiers of my invention by the methods known in the prior art, are vulcanized in the usual manner after they are molded or shaped into the desired shape by the numerous shaping operations of the prior art, such as calendering, casting from solution, continuous or discontinuous extrusion, molding in open or closed molds, etc., and they can be used for the many purposes for which other similar compositions are used. For example, they can be used for tire tubes, tire treads, tire casings, shoe soles and heels, raincoats, table covers, hose for the transmission of fluids, belts, balloon coverings, printers' rolls, printers' blankets, engraving plates, aprons, gloves, masks, tanks, battery cases, friction tape, mats, wire insulation, etc. Fabrics can be coated or impregnated by calendering or impregnation with a suitable emulsion.

The softeners and tackifiers of my invention can be added to the rubber in any one of various ways. For example, they can be added during the milling operation along with one or more of the other compounding ingredients. In certain instances it is preferred to add the polycyclic alcohols to the latex of the polymer by the masterbatching technique. By this procedure the softener and tackifier, or mixture thereof, is emulsified in water and this emulsion is added to the latex prior to coagulation. The softener and tackifier can, in some cases, be added to the latex as a solution in a suitable hydrocarbon or other solvent, or, if desired, it can be added per se, i. e., without any solvent or suspending agent.

A more comprehensive understanding of the invention may be obtained by reference to the following examples which are not intended, however, to be unduly limitative of the invention.

EXAMPLE I

Preparation of 2,3,4,5-bis($\Delta^2$-butenylene)-tetrahydrofurfuryl alcohol.

A run was made wherein 250 grams of potassium hydroxide was dissolved in 375 ml. of methyl alcohol and the solution so formed added with stirring over a period of 30 minutes to 306 grams of 2,3,4,5-bis($\Delta^2$-butenylene)-tetrahydrofurfural, said 2,3,4,5-bis($\Delta^2$-butenylene) tetrahydrofurfural being dissolved in 150 ml. of 40 weight per cent aqueous formaldehyde and 400 ml. of methyl alcohol. Temperature of the reaction mixture during said addition was maintained at about 60° C. for 3 hours after the addition was completed. Methanol was removed by vacuum distillation and 450 ml. of water was then added. Phase separation occurred, the bottom layer being the aqueous layer. The top layer, containing most of the product, was removed. The bottom layer was extracted with three 200 ml. portions of benzene. The benzene extract and the top layer were combined and washed with five 50 ml. portions of water. Benzene was removed by vacuum distillation to provide 275.1 grams of crude 2,3,4,5 - bis($\Delta^2$ - butenylene) - tetrahydrofurfuryl alcohol. The crude alcohol was a light yellow, viscous liquid which slowly crystallized on standing at room temperature (25° C.).

The crude product was distilled under vacuum to provide pure 2,3,4,5-bis($\Delta^2$-butenylene)-tetrahydrofurfuryl alcohol which was a white crystalline solid having a melting point of 33 to 35° C., refractive index $n_D^{20}$ 1.5335, and a hydroxyl number of 259. The pure product was readily soluble in benzene, isopentane, n-pentane, n-heptane, methanol, and ethanol. The 2,4-dinitrobenzoate derivative of said 2,3,4,5-bis($\Delta^2$-butenylene)-tetrahydrofurfuryl alcohol had a melting point of 75–77° C.

EXAMPLE II 2,3,4,5-bis($\Delta^2$-butenylene) - tetrahydrofurfuryl alcohol was evaluated as a softener in a 74/26 1,3-butadiene-acrylonitrile rubber (Paracril 26) prepared by emulsion polymerization. The following compounding recipes were employed, I having a softener loading of 10 parts softener per 100 parts of rubber and II having a softener loading of 20 parts softener per 100 parts of rubber.

|  | Parts by weight ||
|---|---|---|
|  | I | II |
| 1,3-butadiene-acrylonitrile copolymer | 100 | 100 |
| Philblack A [1] | 60 | 60 |
| Zinc oxide | 5 | 5 |
| Altax [2] | 1.5 | 1.5 |
| Stearic Acid | 1.5 | 2.0 |
| Sulfur | 1.5 | 1.75 |
| Softener | 10 | 20 |

[1] Medium abrasion furnace black.
[2] Benzothiazyl disulfide.

The samples were compounded by mill mixing and cured at 307° F. for 30 minutes. The results obtained are set forth in Table No. 1.

Table No. 1
80° F.

| Softener | PHR [1] Softener | 300% Modulus, p. s. i. | Tensile p. s. i. | Percent Elongation | Shore Hardness | Percent Compression Set | Mooney [2] Value |
|---|---|---|---|---|---|---|---|
| 2,3,4,5-bis($\Delta^2$-butenylene)-tetrahydrofurfuryl alcohol | 10 | 2,090 | 2,850 | 400 | 64 | 12.2 | 44.5 |
|  | 20 | 1,850 | 2,750 | 420 | 59 | 14.1 | 34.5 |

OVEN AGED 24 HOURS AT 212° F.

| 2,3,4,5-bis($\Delta^2$-butenylene)-tetrahydrofurfuryl alcohol | 10 | 3,250 | 3,250 | 300 | | | |
|---|---|---|---|---|---|---|---|
|  | 20 | | 3,080 | 290 | | | |

[1] PHR—parts per 100 parts of rubber.
[2] Compounded Mooney value—small rotor for 1½ minutes at 212° F. according to ASTM-D927-49T.

Many substitutions, modifications and improvements may be made by those skilled in the art upon reading this disclosure without departing from the spirit or scope of this invention.

I claim:

1. A rubber-like, vulcanizable composition comprising a rubber-like sulfur vulcanizable organic elastomer and a polycyclic alcohol represented by the general formula:

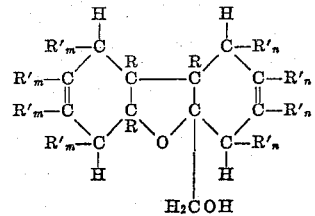

wherein R is selected from the group consisting of hydrogen and methyl radical wherein at least one R is hydrogen, wherein each R' is selected from the group consisting of hydrogen and an alkyl radical having not more than 3 carbon atoms and wherein the sum of the carbon atoms in the $R'_m$ and in the $R'_n$ in each case is not greater than 3 and wherein at least two of the $R'_m$ and at least two of the $R'_n$ are hydrogen.

2. The composition of claim 1 wherein said sulfur vulcanizable organic elastomer is a copolymer prepared by copolymerization of 1,3 butadiene and acrylonitrile in an emulsion system and said polycyclic alcohol is present in an amount in the range of 1 to 75 parts by weight per 100 parts by weight of said vulcanizable organic elastomer.

3. The composition of claim 1 wherein said sulfur vulcanizable organic elastomer is a copolymer prepared by copolymerization of butadiene and styrene in an emulsion system and said polycyclic alcohol is present in an amount in the range of 1 to 75 parts by weight per 100 parts by weight of said vulcanizable organic elastomer.

4. The composition of claim 1 wherein said sulfur vulcanizable elastomer is natural rubber and said polycyclic alcohol is present in an amount in the range of 1 to 75 parts by weight per 100 parts by weight of said natural rubber.

5. The composition of claim 1 wherein said polycyclic alcohol is 2,3,4,5-bis($\Delta^2$-butenylene)-tetrahydrofurfuryl alcohol.

6. The composition of claim 1 wherein said polycyclic alcohol is 3-methyl-2,3,4,5-bis($\Delta^2$-butenylene)-tetrahydrofurfuryl alcohol.

7. The composition of claim 1 wherein said polycyclic alcohol is 4-methyl-2,3,4,5-bis(3-methyl-$\Delta^2$-butenylene)-tetrahydrofurfuryl alcohol.

8. A product of vulcanization comprising a sulfur vulcanizable organic elastomer which has been vulcanized with a vulcanizing agent in the presence of a polycyclic alcohol represented by the general formula:

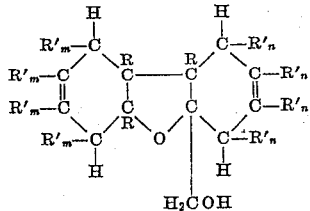

wherein R is selected from the group consisting of hydrogen and methyl radical wherein at least one R is hydrogen wherein each R' is selected from the group consisting of hydrogen and an alkyl radical having not more than 3 carbon atoms and wherein the sum of the carbon atoms in the R'$_m$ and in the R'$_n$ in each case is not greater than 3 and wherein at least two of the R'$_m$ and at least two of the R'$_n$ are hydrogen.

9. A vulcanizate of claim 8 wherein said sulfur vulcanizable organic elastomer is a copolymer prepared by copolymerization of 1,3-butadiene and acrylonitrile in an emulsion system and said polycyclic alcohol is present in an amount in the range of 1 to 75 parts by weight per 100 parts by weight of said vulcanizable organic elastomer.

10. A vulcanizate of claim 8 wherein said sulfur vulcanizable organic elastomer is a copolymer prepared by copolymerization of butadiene and styrene in an emulsion system and said polycyclic alcohol is present in an amount in the range of 1 to 75 parts by weight per 100 parts by weight of said vulcanizable organic elastomer.

11. A vulcanizate of claim 8 wherein said sulfur vulcanizable elastomer is natural rubber and said polycyclic alcohol is present in an amount in the range of 1 to 75 parts by weight per 100 parts by weight of said natural rubber.

12. The vulcanizate of claim 8 wherein said polycyclic alcohol is 2,3,4,5-bis($\Delta^2$-butenylene)-tetrahydrofurfuryl alcohol.

13. The vulcanizate of claim 8 wherein said polycyclic alcohol is 3-methyl-2,3,4,5-bis($\Delta^2$-butenylene)-tetrahydrofurfuryl alcohol.

14. The vulcanizate of claim 8 wherein said polycyclic alcohol is 4-methyl-2,3,4,5-bis(3-methyl-$\Delta^2$-butenylene)-tetrahydrofurfuryl alcohol.

15. The composition of claim 1 wherein said sulfur vulcanizable organic elastomer is a copolymer prepared by copolymerization of 1,3-butadiene and acrylonitrile and said polycyclic alcohol is 2,3,4,5-bis($\Delta^2$-butenylene)-tetrahydrofurfuryl alcohol, said alcohol being present in an amount in the range of 3 to 25 parts by weight per 100 parts by weight of said vulcanizable organic elastomer.

No references cited.